May 30, 1950 J. E. WERNER ET AL 2,509,381
NOISE SUPPRESSION MEANS FOR COMMUNICATION RECEIVING APPARATUS
Filed Oct. 23, 1946
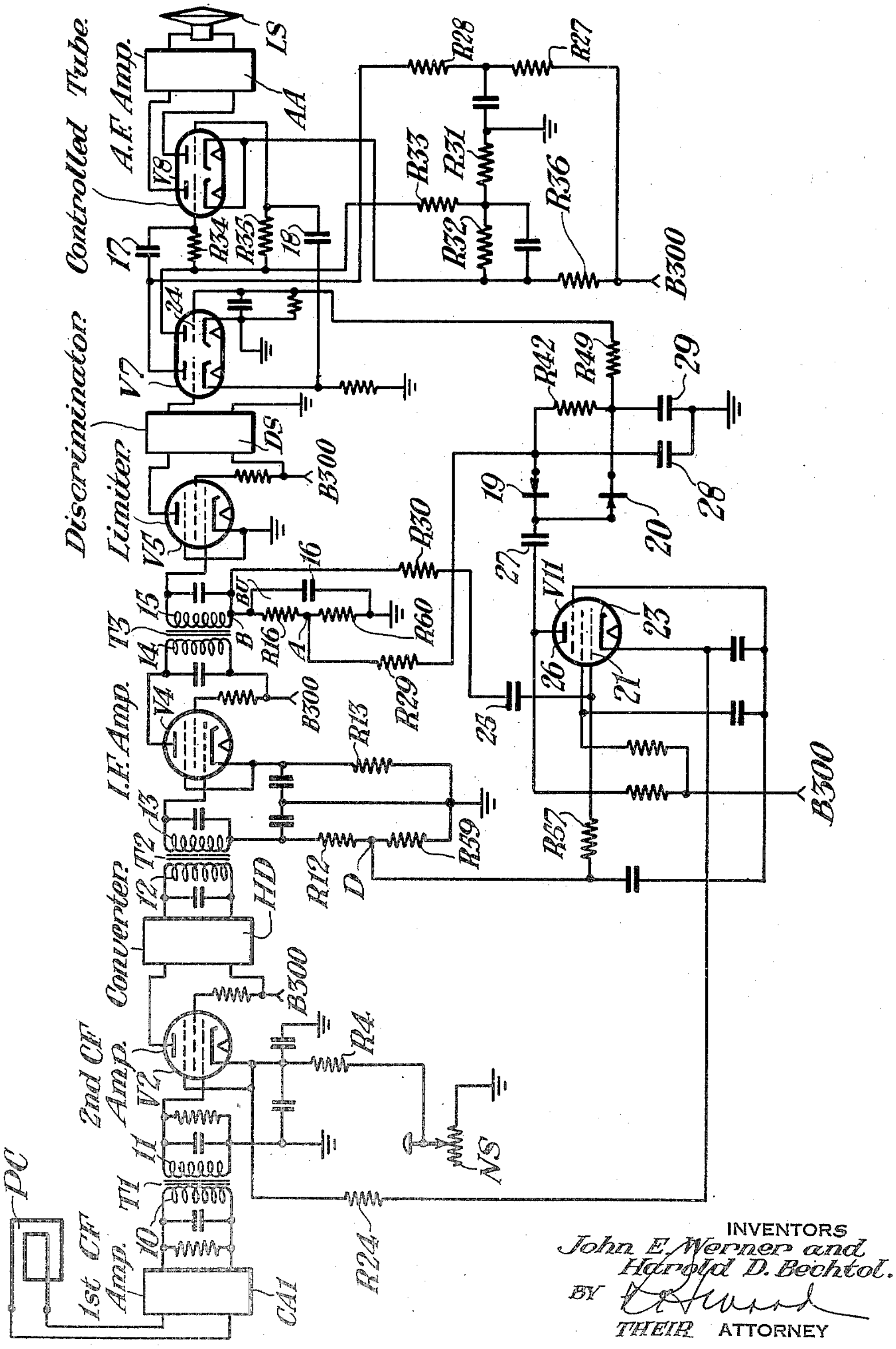
INVENTORS
John E. Werner and
Harold D. Bechtol.
BY [signature]
THEIR ATTORNEY Patented May 30, 1950

2,509,381

UNITED STATES PATENT OFFICE 2,509,381

NOISE SUPPRESSION MEANS FOR COMMUNICATION RECEIVING APPARATUS

John E. Werner, Glenshaw, and Harold D. Bechtol, Edgewood, Pa., assignors to The Union Switch & Signal Company, Swissvale, Pa., a corporation of Pennsylvania Application October 23, 1946, Serial No. 705,094

2 Claims. (Cl. 250—20)

Our invention relates to noise suppression means for communication receiving apparatus, and more particularly to noise suppression means for receiving apparatus using frequency modulation.

The receiving apparatus of communication systems, such as, railway train telephone systems, is generally retained in an active condition except during sending periods from the same location, and spurious energy picked up during non-communication periods may create noise. Furthermore, in receiving apparatus for a relatively low carrier frequency such as is used in railway train telephone systems of the inductive carrier type, the present day so called "squelch" circuits are not entirely satisfactory due to the invariably high noise energy level at these low frequencies and the high gain required for the receiving apparatus.

Accordingly, a feature of our invention is the provision of improved noise suppression means for communication apparatus.

Another feature of our invention is the provision of receiving apparatus of the type here involved incorporating novel means wherewith the output amplifier stage is desensitized during non-communication periods and is conditioned for its usable sensitivity when communication energy of a preselected minimum value is picked up.

Again, a feature of our invention is the provision of receiving apparatus of the type here contemplated incorporating a novel "squelch" circuit arrangement having an automatic volume control.

Other features, objects and advantages of our invention will appear as the specification progresses.

To attain the foregoing objects, features and advantages of our invention, we provide a controlled amplifier tube and a noise responsive circuit network. The controlled amplifier tube is used to drive an audio frequency amplifier of the receiving apparatus and thus when the controlled tube is desensitized no energy is passed to the audio amplifier with the result the loud-speaker and other telephone receivers in the output of the apparatus are silent.

The sensitivity of the controlled tube is governed through a voltage derived from a voltage divider network interposed in the anode circuit of a control or squelch tube of the noise responsive circuit network, connections being provided in the divider network to supply variable voltages to the grid and cathode of the controlled tube.

The noise responsive circuit network includes a noise amplifier tube, a rectifier and an automatic volume control circuit together with the control or squelch tube. The squelch tube is controlled by voltages derived from preselected terminals of the receiving apparatus at points ahead of the demodulator. One of the voltages is derived from the grid circuit of a limiter tube of the apparatus, and a second voltge is derived by taking the alternating current noise voltage and amplifying it at the noise amplifier and rectifying the amplified energy.

The automatic volume control for the noise amplifier is derived by combining two voltages, one taken from an intermediate amplifier stage and a variable cathode voltage taken from a carrier frequency stage.

We shall describe one form of apparatus embodying our invention and shall then point out the novel features thereof in claims.

The accompanying drawing is a diagrammatic view showing one form of apparatus embodying our invention when used with a superheterodyne type of receiving apparatus for an inductive carrier railway train telephone system employing frequency modulation. It is to be understood that our invention is not limited in its use to train telephone receiving apparatus, and this one application of the invention serves to illustrate the many places the apparatus is useful.

Referring to the drawing the receiving apparatus is of the superheterodyne type for frequency modulated carrier telephone current and it includes a first and a second carrier frequency amplifier stage, a converter stage, an intermediate frequency amplifier stage, a limiter and a discriminator, together with audio frequency stages as required.

The reference character PC designates a pick-up coil or antenna capable of picking up frequency modulating carrier telephone current sent out by a remote transmitter, not shown. The coil PC is connected to the input of a first carrier frequency amplifier CA1, shown in block form, since it may be of standard form and its specific structure forms no part of our invention The output of the amplifier CA1 includes a tuned primary winding 10 of a coupling transformer T1, a tuned secondary winding 11 of which transformer is connected to the input of a second carrier frequency amplifier tube V2, tube V2 having a control grid cathode circuit including secondary winding 11 of transformer T1, ground, a manually adjustable potentiometer NS and a resistor R4. An anode cathode circuit of tube V2 is powered from positive terminal B300 of a suitable power source, the negative terminal of which source is connected to ground in the usual manner for the power supply of such receiving apparatus. This anode cathode circuit is completed through the input of a converter stage HD.

The converter or mixer stage HD is shown in block form since such device may be any one of several well-known arrangements, and it is sufficient for the present application to point out that the amplified frequency modulated telephone current is heterodyned with a local generated carrier to provide an intermediate carrier wave having the modulation of the original received wave. The output current of the converter stage HD is supplied to a tuned primary winding 12 of a coupling transformer T2, a tuned secondary winding 13 of which transformer is connected to the control grid cathode circuit of tube V4 of the intermediate frequency amplifier. This control grid cathode circuit for tube V4 is completed through resistors R12, R 59 and R13, the junction terminal of resistors R59 and R13 being connected to ground. An anode cathode circuit for tube V4 is powered from the B300 source and includes a tuned primary winding 14 of a coupler transformer T3, a tuned secondary winding 15 of which transformer is connected to an input or control grid cathode circuit of a limiter tube V5. This circuit for tube V5 is completed through a biasing unit BU which comprises a capacitor 16 in multiple with resistors R16 and R60 in series. In the usual manner the limiter tube and its associated circuits are arranged for its anode circuit to saturate with a small positive control grid voltage so that the amplitude of the output is substantially constant for all control voltages above a minimum required value. The output of limiter tube V5 is supplied to a discriminator network DS.

The discriminator network DS is shown in block form since the details of such network are well known and it is sufficient for this application to point out that the constant amplitude varying frequency wave of the limiter tube output when applied to the discriminator is converted into a modulated rectified wave of constant carrier frequency and varying amplitude.

The output of the discriminator DS is applied to the input of a first section of a twin triode tube V7, and which section serves as a phase inverter. The second or right-hand section of tube V7 as viewed in the drawing serves as a control or squelch tube to be more fully explained shortly. The two sections of tube V7 are coupled to a twin triode controlled amplifier tube V8, the input of the two sections of tube V8 being arranged in such a manner that the communication energy from the phase inverter section of tube V7 is applied in push-pull and a voltage from the squelch section of tube V7 is applied in parallel to the grids of tube V8. Specifically, the anode and cathode of the phase inverter section of tube V7 are connected to the grids of the two sections of tube V8 through capacitors 17 and 18, respectively, and the anode circuit of the squelch section of tube V7 is connected to the grids of tube V8 through resistors R34 and R35, respectively. The anode circuit of the phase inverter section of tube V7 is powered from the terminal B300 through resistors R27 and R28 in series, and the anode circuit of the squelch section of tube V7 is powered from a voltage divider including resistors R31 and R32 connected across the power source through another resistor R36, the junction terminal of resistors R31 and R32 being connected to the anode of the squelch section of tube V7 through a resistor R33 and the cathode of the squelch section being connected to ground.

The control or squelch section of tube V7 is normally conductive for reasons to appear hereinafter, and its anode current drawn through resistor R33 of a relatively high value drops the anode voltage to a relatively low value and therefore the voltage applied through resistors R34 and R35 to the grids of the controlled tube V8 is of a low value. The cathodes of the tube V8 are connected to the voltage divider in a manner to have a relatively high potential due to the voltage divider effect of resistors R36, R31 and R32. In this way the controlled tube V8 is biased to cutoff and is desensitized as long as the squelch section of tube V7 is conductive. With the controlled tube V8 desensitized then no energy is passed to an audio amplifier stage AA and on to a loud-speaker LS. That is to say, the output of the two sections of the controlled tube V8 are connected to an audio amplifier AA in a push-pull manner, the audio frequency amplifier AA being shown in block form since it may be of any standard arrangement. The output of the amplifier AA is used in turn to supply energy to a telephone receiver such as a loud-speaker LS. It is to be seen therefore that as long as the squelch tube is conductive the controlled tube V8 is maintained desensitized and no energy is passed to the audio amplifier and on to the loud-speaker.

The noise responsive circuit network includes a noise amplifier tube V11, rectifiers 19 and 20, and an automatic volume control circuit together with the squelch section of tube V7.

It is believed that the noise responsive circuit network and its connections can best be understood from a description of the operation of the apparatus, and in describing the operation of the apparatus we shall first consider the normal stand-by condition, that is, the condition when no communication current is being received. Under these circumstances the apparatus operates at its greatest possible sensitivity so that it will detect communication current of a minimum energy level while at the same time the noise suppression means blocks the passing of noise voltages to the audio amplifier and on to the loud-speaker.

Assuming a noise voltage is picked up by the coil PC, this voltage is amplified at the first and second stages of the carrier amplifiers and is impressed upon the local carrier at the converter stage HD and is then applied to the grid circuit of the intermediate frequency amplifier tube V4. This noise energy after amplification at tube V4 is applied to limiter tube V5 and the resultant grid current of tube V5 causes a direct voltage drop across resistors R60 and R16, the junction terminal A of resistors R60 and R16 being negative in potential with respect to ground. The direct voltage of terminal A is applied to control grid 24 of the squelch section of tube V7, the connection including resistors R29, R42 and R49. This voltage at terminal A being negative in potential with respect to ground, it tends to render the grid 24 of the squelch tube negative with respect to the cathode and hence tends to render this tube non-conductive.

At the same time, the amplitude variations of the noise voltage at terminal B of the grid circuit of the limiter tube V5 is applied through resistor R30 and capacitor 25 to a control grid 21 of noise amplifier tube V11, and such noise voltage is amplified in the anode circuit of the tube V11.

The alternating current component of the anode circuit of tube V11 is applied to rectifiers 19 and 20 through a coupling capacitor 27. The output sides of the rectifiers 19 and 20 are connected to two capacitors 28 and 29, the connection being such that the two capacitors are charged alternately. The two capacitors 28 and 29 in series are connected across resistor R42 as a load resistor and develop a voltage across this resistor which is applied through resistor R49 to the control grid 24 of the squelch tube. The polarity of this voltage developed across resistor R42 is such as to drive the squelch tube in the positive direction or in other words, the polarity of the second direct voltage applied to the squelch tube is opposite that applied to the squelch tube from terminal A of the grid circuit of limiter tube V5. The parts are so proportioned that these two direct voltages when produced by noise energy balance out and the squelch tube remains conductive, or in other words, its conduction is not disturbed by the noise energy and as long as the squelch tube remains conductive then the controlled tube V8 remains desensitized and the noise energy is not passed to the audio amplifier.

It is to be pointed out that when this noise energy is applied to the intermediate frequency amplifier tube V4, a direct current flows in the grid circuit and a direct voltage is developed across the combination of resistors R59 and R12, the junction terminal D of the two resistors being negative with respect to ground. This direct voltage at terminal D is applied to the control grid 21 of the noise amplifier tube V11, through a connection including resistor R57, and since it is negative with respect to ground it tends to decrease the gain at the noise amplifier tube, or in other words, it tends to act as an automatic volume control voltage for the tube V11.

There is also a bias voltage applied to cathode 23 of the noise amplifier tube V11 by means of a connection including resistors R24 and R4 and the manually adjustable potentiometer NS, as will be readily understood by an inspection of the drawing. This latter voltage is a combination of that developed by the cathode current of tube V11 flowing through resistors R24, R4 and NS, plus that developed by the cathode current of tube V2 flowing through resistors R4 and NS. As pointed out hereinbefore, the potentiometer NS is manually set for the most sensitive condition of the tube V2 and under such conditions the gain of the noise amplifier V11 is a function of the voltage developed at terminal D.

Due to the automatic volume control action on tube V11 by the noise voltage derived at terminal D of the grid circuit of tube V4, the two noise voltages applied to the grid 24 of the squelch tube are made substantially equal and produce a resultant voltage of approximately zero through a relatively wide range of noise energy level, with the result that the function of the squelch tube is not disturbed or varied by noise energy of a relatively wide range. That is to say, if the noise voltage picked up is very high, the amplification of the voltage may be almost linear up to the grid circuit of the limiter tube and grid current of tube V4 will produce a corresponding voltage drop across resistor R59 with the result that a high negative voltage of terminal D is applied to the grid of the noise amplifier tube V11 to reduce its gain. The direct voltage across resistor R60 will not increase to such a great extent because tube V5 acts as a limiter tube. The alternating current voltage at terminal B would increase in proportion to the input noise voltage but would not be amplified to such a great extent by tube V11 due to the automatic volume control action and the voltages applied to the squelch tube through resistor R49 will remain approximately equal and opposite.

We shall next assume that frequency modulated carrier telephone current for which the apparatus is designed is picked up by the coil PC. This telephone current is amplified through the various stages and a corresponding direct voltage is developed across resistor R59 due to the grid current produced for the tube V4. This voltage of terminal D is applied to the noise amplifier tube V11 to reduce its gain as explained hereinbefore. The telephone current also produces a direct voltage at terminal A of the limiter tube, the voltage of terminal A now being that produced not only by the carrier telephone current but also by any noise voltage that may be present. This direct voltage at terminal A is applied to the control grid 24 of the squelch tube tending to render that squelch tube non-conductive. The telephone current will produce little or no alternating voltage at terminal B to be applied to the noise amplifier tube V11. Thus the voltage created across the resistor R42 due to the output of the noise amplifier tube V11 is not increased by the telephone current energy. This means that the resultant voltage applied to grid 24 of the squelch tube is negative in value and the squelch tube is made non-conductive. The negative bias voltage applied to the squelch tube is ordinarily of a value sufficient even with a very weak carrier telephone current to cause the squelch tube to become substantially non-conductive. When anode current of the squelch tube ceases to flow through resistor R33 of the voltage divider network, the negative bias of the controlled tube V8 is removed to a degree that the tube V8 functions at substantially its usable sensitivity, with the result the telephone current energy is passed to the audio amplifier AA and the speech is sounded at the loud-speaker.

We have found that noise suppression means such as here disclosed and using an automatic volume control for the noise amplifier can be adjusted to substantially suppress noise of relatively large amplitude and yet be responsive to very weak telephone currents.

Although we have herein shown and described but one form of noise suppression means for communication receiving apparatus embodying our invention, it is understood that various changes and modifications may be made therein within the scope of the appended claims without departing from the spirit and scope of our invention.

Having thus described our invention, what we claim is:

1. In noise suppression means for receiving apparatus using a modulated carrier current and which apparatus includes a carrier frequency amplifier tube, an intermediate frequency amplifier tube, a limiter tube, a demodulator and a controlled audio frequency amplifier tube and each of which tubes is provided with an anode, a cathode and a control grid; the combination comprising, a control tube having an anode, a cathode and a control grid, said control tube having an anode-cathode circuit, means including a coupling between the anode-cathode circuit of the control tube and the control grid-cathode circuit of the controlled audio frequency amplifier responsive to the conduction or non-conduction of the control tube to render the controlled tube insensitive or sensitive, a control grid-cathode circuit for said limiter tube and which circuit includes a control unit comprising resistance and capacitance connected in multiple, said unit being connected in the control grid-cathode circuit of the limiter tube adjacent the cathode, a first and a second circuit means to connect said control grid-cathode of said limiter tube to the control grid of said control tube, said first circuit means including resistance and connected between an intermediate terminal of said resistance of said control unit and the control grid of the control tube, said first circuit means being effective to apply to the control tube a direct voltage due to the limiter tube grid-cathode rectification all energy picked up by the receiving apparatus and which direct voltage is of the polarity which tends to render the control tube nonconductive; a noise amplifier tube having an anode, a cathode and a control grid; a rectifier, said second circuit means including in cascade said noise amplifier tube and said rectifier and connected between a terminal of the capacitance of said control unit and the control grid of the control tube, said second circuit means being effective to apply another direct voltage to the control tube due to the amplified and rectified alternating current component of noise energy applied to the limiter tube and which last mentioned direct voltage is of a polarity which tends to render said control tube conductive, a resistance capacitance unit interposed in a grid-cathode circuit of said intermediate frequency amplifier tube, an adjustable resistor interposed in the cathode lead of said carrier frequency amplifier tube, and a third circuit means having a first path including a resistor to connect the grid of the noise amplifier tube to the grid circuit unit of said intermediate amplifier tube to apply a direct voltage developed by rectification of energy supplied to said intermediate amplifier tube to the grid of the noise amplifier tube for automatically controlling the gain of the noise amplifier tube and a second path including another resistor to connect the cathode of the noise amplifier tube to said adjustable resistor which is interposed in the lead of the cathode of said carrier frequency amplifier tube to select the sensitivity of said noise amplifier tube in step with the adjustment of the sensitivity of the carrier frequency amplifier tube.

2. In noise suppression means for communication current receiving apparatus which includes a carrier frequency amplifier tube, a converter, an intermediate frequency amplifier tube, a limiter tube, a discriminator and a controlled audio frequency amplifier tube and each of which tubes has an anode, a cathode and a control grid and each is provided with an anode-cathode circuit and a grid-cathode circuit, the grid-cathode circuit of the intermediate amplifier tube and of the limited tube including a resistance capacitance unit and the anode-cathode circuit of the carrier frequency amplifier tube including an adjustable resistor interposed in the cathode lead of the circuit; the combination comprising; a control tube having an anode, a cathode and a control grid and provided with an anode-cathode circuit, means including a coupling between the anode-cathode circuit of the control tube and the grid-cathode circuit of said controlled audio frequency amplifier tube responsive to the conduction and non-conduction of the control tube to render the controlled tube insensitive or sensitive; a noise amplifier tube having an anode, a cathode and a control grid; a rectifier, circuit means including two paths connected between said unit of the limiter tube grid-cathode circuit and the control grid of said control tube to control the conductive condition of the control tube, a first one of said paths including resistance only to apply a direct voltage developed in the grid-cathode circuit of the limiter tube due to the grid rectification of energy applied to the limiter tube, a second one of said paths including said noise amplifier tube and said rectifier to apply a direct voltage due to the amplifying and rectifying of the amplitude variations of the energy applied to the limiter tube, said noise amplifier tube provided with an anode-cathode circuit and the cathode lead of which includes said adjustable resistor for the sensitivity of the noise amplifier tube to be selected according to the selected sensitivity of the carrier amplifier tube, and means to connect the control grid of the noise amplifier tube to said unit in the grid-cathode circuit of the intermediate amplifier tube to automatically control the gain of the noise amplifier tube due to a direct voltage developed by the grid rectification of energy applied to the intermediate amplifier tube.

JOHN E. WERNER.
HAROLD D. BECHTOL.

REFERENCES CITED

The following references are of record in the file of this patent:

UNITED STATES PATENTS

| Number | Name | Date |
|---|---|---|
| 2,101,549 | Lamb | Dec. 7, 1937 |
| 2,239,901 | Percival | Apr. 29, 1941 |
| 2,341,325 | Kenefake | Feb. 8, 1944 |
| 2,343,115 | Noble | Feb. 29, 1944 |
| 2,372,934 | Campbell | Apr. 3, 1945 |

Certificate of Correction

Patent No. 2,509,381 May 30, 1950

JOHN E. WERNER ET AL.

It is hereby certified that errors appear in the printed specification of the above numbered patent requiring correction as follows:

Column 7, line 9, after "grid-cathode" insert the word *circuit*; line 16, before "all" insert *of*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*